Patented Mar. 28, 1944

2,345,126

UNITED STATES PATENT OFFICE 2,345,126

MANUFACTURE OF RESINOUS PRODUCTS DERIVED FROM ACRYLIC ACID

Thomas Sefton Ireland, Penketh, Warrington, England, assignor to Imperial Chemical Industries Limited, a corporation of Great Britain No Drawing. Application February 28, 1940, Serial No. 321,352. In Great Britain March 9, 1939

11 Claims. (Cl. 260—83)

This invention relates to improvements in the manufacture of resinous products obtained from alpha-haloacrylic acid esters.

It has been proposed in copending United States patent application Serial No. 270,900, filed April 29, 1939, now U. S. Patent No. 2,286,264, to prepare moulding compositions, comprising interpolymers of alpha-chlorocrylic esters with other unsaturated organic compounds, together, if desired, with plasticizers, softeners or fillers. In many cases the appearance of polymers of alpha-chloroacrylic acid and its esters is marred by a yellowish coloration, sometimes apparent immediately on polymerisation, while in other cases only after a lapse of time or when the materials are heated. The formation of this yellow colour is believed to be due to the presence of autoxidation products of the monomer. In copending U. S. Patent No. 2,314,443, issued March 23, 1943, it has been proposed to bring about considerable diminution in the extent of the coloration by subjecting the monomer to a treatment which will free it from autoxidation products, e. g., by distillation in the substantial absence of atmospheric oxygen, preferably after washing with an aqueous reducing agent, or by treatment with a reducing agent or a compound having a labile oxygen atom, and simultaneously or subsequently with an alkaline material. In practice, while considerable improvements are achieved by the above mentioned treatments, complete suppression of the yellow colour does not in general result.

It is an object of the present invention to prepare resinous products from alpha-haloacrylic acid esters which have an even smaller tendency to develop yellow coloration. It is a further object of the invention to prepare resinous products from alpha-chloroacrylic acid esters which have an even smaller tendency to develop yellow coloration. A further object of the invention is to prepare novel resinous compositions from alpha-haloacrylic acid esters having a high stability against coloration on heating. It is a still further object of the invention to prepare novel resinous compositions from alpha-chloroacrylic esters having high stability against coloration on heating. Other objects will be apparent hereinafter.

According to the present invention these objects are achieved by incorporating with a polymerisable ester of an alpha-haloacrylic acid which is substantially free from autoxidation products, or with a composition comprising such an ester, a stabiliser for the polymeric ester as hereinafter defined, and subsequently polymerising the ester.

Stabilizers for the polymeric alpha-haloacrylic esters which may be used are compounds soluble to the extent of at least 0.1% in the monmeric ester and having the formula $R(OH)_x$, R being an aliphatic hydrocarbon radicle of valence $x$, $x$ being an integer and at least two, a partial ester thereof with an organic monocarboxylic acid, or a partial ether thereof.

Esters which may be treated according to my invention include, for example, the methyl and ethyl esters and the propyl esters of alpha-chloroacrylic acid and of alpha-bromoacrylic acid, and the invention may be usefully applied to alpha-chloroacrylic acid esters which have been treated according to U. S. Patent No. 2,314,443, issued March 23, 1943. The inhibition of color production is evidenced not only during the steps of polymerising the monomeric body, but also in the improved resistance of the resin towards development of colour on prolonged heating.

Examples of stabilizers for the polymeric esters which may be used in my invention include glycol and glycerol, and suitable ester and ether derivatives are the isomeric forms of monoacetin, diacetin, monobutyrin, glyceryl monophenyl ether and glyceryl diphenyl ether. While the above compounds are all sufficiently soluble for use in my invention, other compounds, e. g., the higher polyhydric alcohols such as the hexoses, have but a vanishingly small solubility in at least the majority of alpha-haloacrylic acid esters, and in such cases are not suitable for use in my invention. In general a small proportion, e. g., 0.1 per cent to 5.0 per cent by weight, of the stabilizer is a suitable amount to incorporate in the polymerisable ester.

The incorporation of the stabiliser is conveniently effected by dissolving it in the monomeric body shortly before polymerisation, or in the case of monomers treated by such processes as those forming the subject of copending U. S. Patent No. 2,314,443, issued March 23, 1943, immediately after such treatments have been carried out. The compounds may also be incorporated with partially polymerised alpha-haloacrylic acid esters which are still in a liquid condition. However, in such cases some colour may have been generated during the partial polymerisation, and for this reason we have found it better to incorporate the stabiliser in the monomeric body.

The polymerisation of the ester to the resinous condition is preferably effected by heating in the present of a peroxide polymerisation catalyst such as benzoyl peroxide or succinyl monoperacid, and it may be carried out so as to produce articles directly; alternatively, for example, the monomer may be polymerised in globular suspension to produce a granular polymer, or emulsions of the monomer may be polymerised giving emulsions of the polymer. It is also possible to effect the polymerisation by the action of actinic radiation, but such radiation also promotes autoxidation, and thus where this method is to be employed, oxygen or oxygen-containing gases, e. g., air, should be excluded during the polymerisation.

The invention may also be applied to the manufacture of resinous products by interpolymerising an alpha-haloacrylic acid ester, e. g., an alpha-chloroacrylic acid ester, with a second polymerisable compound, such as a vinyl compound, or with a compound which while not itself polymerisable forms interpolymers with alpha-haloacrylic compounds, as, for example, with a crotonic acid ester or an ester of beta-methyl allyl alcohol. Thus a monomeric alpha-chloroacrylic acid ester treated with a stabilizer for the polymeric ester according to the invention, may be mixed with a second constituent and the interpolymer formed by subjecting the mixture to heat, suitably in the presence of a polymerisation catalyst. Subsequent generation of colour in the interpolymer is accordingly diminished.

The following examples illustrate but do not limit my invention, all parts being by weight:—

Example I

Portions of freshly distilled methyl alpha-chloroacrylate containing each 0.025 per cent of benzoyl peroxide as a polymerisation catalyst were mixed with 0.5 per cent of monoacetin and monobutyrin respectively; two further portions also containing each 0.025 per cent of benzoyl peroxide as a polymerisation catalyst were mixed with 0.2 per cent of ethylene glycol and glycerol respectively. The portions were then polymerised by heating at 60° C. for 20 hours. Cylindrical specimens of each sample were prepared each 7 cm. long and having polished ends, and the colour of each cylinder as viewed along its axis was determined by a Lovibond tintometer after heating at 100–110° C. for various times. The colour so measured is given in the following table, expressed as total Lovibond units. In each case the total is composed of red and yellow values, the yellow predominating in each case. For comparison there is given in the table the colour of a sample obtained and treated in the same way except for the incorporation of a colour inhibitor.

| Colour inhibitor | Colour in Lovibond units after heating for— | | | |
| --- | --- | --- | --- | --- |
| | 16 hr. | 30 hr. | 112 hr. | 160 hr. |
| None | 1.6 | 1.6 | 4.4 | 4.9 |
| Ethylene glycol (0.2%) | 0.8 | 0.9 | 3.3 | 3.6 |
| Glycerol (0.2%) | 0.8 | 1.1 | 2.6 | 2.9 |
| Monoacetin (0.5%) | 0.8 | 0.8 | 1.4 | 1.4 |
| Monobutyrin (0.5%) | 0.8 | 0.8 | 1.7 | 2.0 |

Example II

Portions of a different sample of methyl alpha-chloroacrylate substantially free from autoxidation products of the monomer but containing each 0.025 per cent of benzoy peroxide as polymerisation catalyst, were mixed with 0.5 per cent of glyceryl monophenyl ether and glyceryl diphenyl ether respectively, and then polymerised by heating at 60° C. for 20 hours. The resins obtained were further heated at 100 C. for 16 hours and the coloration determined as in Example I. The results given below were obtained, the colour being again expressed as total Lovibond units, and composed of red and yellow values with the yellow predominating.

For comparison there is given in the table the colour of a sample obtained and treated in precisely the same way except for the incorporation of a colour inhibitor.

| Reagent | Colour |
| --- | --- |
| None | 1.9 |
| Glyceryl monophenyl ether (0.5%) | 1.2 |
| Glyceryl diphenyl ether (0.5%) | 0.9 |

Certain variations from the description set forth in the foregoing will be evident to those skilled in the art. I intend therefore to be bound only in accordance with the following claims.

I claim:

1. Process for the manufacture of polymerised alpha-haloacrylic acid ester compositions which comprises incorporating with a composition comprising a polymerisable ester of a saturated alcohol with an alpha-haloacrylic acid substantially free from autoxidation products, a stabilizer for the polymeric alpha-haloacrylic ester consisting of a monomeric compound soluble to the extent of at least 0.1 per cent in the monomeric ester and selected from the class consisting of polyhydric alcohols wherein the hydroxyls are attached to a saturated aliphatic hydrocarbon radical, partial esters thereof with short chain saturated aliphatic monocarboxylic acids and partial ethers thereof and subsequently polymerising the composition.

2. Process according to claim 1 in which the alpha-haloacrylic acid ester is an ester of alpha-chloroacrylic acid.

3. Process according to claim 1 in which the polyhydric alcohol of the stabilizer is glycerol.

4. Process for the manufacture of polymerised alpha-haloacrylic acid ester compositions which comprises incorporating with a polymerisable ester of a saturated alcohol with an alpha-haloacrylic acid substantially free from autoxidation products a stabilizer for the polymeric alpha-haloacrylic ester consisting of a compound soluble to the extent of at least 0.1 per cent in the monomeric ester and selected from the class consisting of polyhydric alcohols wherein the hydroxyls are attached to a saturated aliphatic hydrocarbon radical, partial esters thereof with short chain saturated aliphatic monocarboxylic acids and partial ethers thereof, and subsequently polymerising the composition.

5. Process according to claim 4 in which the alpha-haloacrylic acid ester is an ester of alpha-chloroacrylic acid.

6. Process according to claim 4 in which the stabilizer is present in amounts between 0.1% and 5% by weight of the alpha-haloacrylic ester.

7. Process for the manufacture of polymerised alpha-haloacrylic acid ester compositions which comprises incorporating with a composition comprising a polymerisable ester of a saturated alcohol with an alpha-haloacrylic acid substantially free from autoxidation products a stabilizer for the polymeric alpha-haloacrylic ester consisting of a monomeric compound soluble to the extent of at least 0.1 per cent in the monomeric ester and selected from the class consisting of polyhydric alcohols wherein the hydroxyls are attached to a saturated aliphatic hydrocarbon radical, partial esters thereof with short chain saturated aliphatic monocarboxylic acids and partial ethers thereof, and subsequently polymerising the composition by heating in the presence of a peroxide polymerisation catalyst.

8. Process according to claim 7 in which the polymerisation catalyst is benzoyl peroxide.

9. Process for the manufacture of polymerised alpha-haloacrylic acid ester compositions which comprises incorporating with a composition comprising a polymerizable ester of a saturated alcohol with an alpha-haloacrylic acid substantially free from autoxidation products a partial ester of glycerol with a short chain saturated aliphatic monocarboxylic acid as a stabilizer for the polymeric alpha-haloacrylic acid ester, and subsequently polymerizing the composition.

10. Process of claim 9 wherein the polymerizable ester is an alpha-chloroacrylic acid ester and the stabilizer is monoacetin.

11. Process of claim 9 wherein the polymerizable ester is methyl alpha-chloroacrylate and the stabilizer is monoacetin.

THOMAS SEFTON IRELAND.